United States Patent [19]
Green

[11] Patent Number: 6,145,178
[45] Date of Patent: Nov. 14, 2000

[54] MILLING MACHINE WITH HORIZONTAL AND VERTICAL SPINDLES

[75] Inventor: Steve C. Green, West Fork, Ark.

[73] Assignee: Green Technologies, Inc., West Fork, Ark.

[21] Appl. No.: 09/376,989

[22] Filed: Aug. 19, 1999

[51] Int. Cl.$^7$ .......................... B23Q 39/02; B23B 39/16; B23C 1/10

[52] U.S. Cl. .............................. 29/26 A; 29/27 C; 29/53; 408/31; 409/203; 409/213; 409/215; 409/217; 409/237

[58] Field of Search ................... 29/33 P, 26 A, 29/40, 50, 51, 53, 27 R, 27 C; 483/32, 30; 408/43, 35, 42, 53, 31, 234, 235; 409/203, 213, 217, 215, 201, 211, 216, 202, 212, 237, 235

[56] References Cited

U.S. PATENT DOCUMENTS

| | | | |
|---|---|---|---|
| 988,231 | 3/1911 | Vernet | 409/215 |
| 2,983,199 | 5/1961 | Daugherty | 409/235 |
| 3,511,129 | 5/1970 | Müller | 409/137 |
| 3,559,330 | 2/1971 | Wagner | 409/190 |
| 3,958,491 | 5/1976 | Habib . | |
| 4,069,741 | 1/1978 | Ewertowski | 409/23 |
| 4,121,332 | 10/1978 | Corsi | 29/26 A |
| 4,444,534 | 4/1984 | Bergman | 409/235 X |
| 4,516,311 | 5/1985 | Takakuwa | 29/26 A |
| 4,709,465 | 12/1987 | Lewis | 409/144 |
| 4,726,577 | 2/1988 | Pontis | 269/71 |
| 4,785,525 | 11/1988 | Ishida | 29/27 R |
| 5,175,914 | 1/1993 | Mitsukuchi | 29/27 |
| 5,336,025 | 8/1994 | Ozawa et al. | 408/53 |
| 5,442,843 | 8/1995 | Fessler | 29/26 A |
| 5,486,151 | 1/1996 | Bergmann et al. | 483/56 |
| 5,533,846 | 7/1996 | Geissler | 409/201 |
| 5,628,594 | 5/1997 | Fetty | 409/144 |

FOREIGN PATENT DOCUMENTS

| | | | |
|---|---|---|---|
| 3236356 | 4/1985 | Germany | 29/33 P |
| 237 807 | 7/1986 | Germany . | |
| 3722180 | 1/1989 | Germany | 29/27 C |
| 58-149101 | 9/1983 | Japan . | |
| 34204 | 2/1984 | Japan | 408/53 |
| 59-110507 | 6/1984 | Japan . | |
| 774918 | 10/1980 | U.S.S.R. . | |

OTHER PUBLICATIONS

Catalog page from FIL Fresatrici.

Primary Examiner—William Briggs

[57] ABSTRACT

A machine tool comprises a base with an upstanding column, a vertical spindle axis tool driving unit symmetrically located and vertically movable on the front of the column, a frontwards oriented horizontal spindle axis tool driving unit symmetrically located and vertically movable extending through the column, and a pair of guiding rails to extend vertically thereon and horizontally spaced apart from each other for guiding the upward and downward movement of the tool driving units. Symmetrically disposed counterbalance weights for both tool driving units are located within the column. Independent leadscrew driving means provide vertical upward and downward movement of the tool driving units.

18 Claims, 11 Drawing Sheets

MILLING MACHINE WITH HORIZONTAL AND VERTICAL SPINDLES

BACKGROUND OF THE INVENTION

This invention relates to milling machines that shape workpieces by the removal of material with rotating chip making and grinding tools. While these machines may be manually or computer controlled, modern computer numerical controlled (CNC) milling machines are increasingly performing the greatest proportion of milling tasks. Typical CNC milling machines have a machine spindle head with a rotating spindle shaft that handles a plurality of machining tools, including drills, endmills, and many styles of chip removing cutters. When these CNC milling machines have an included mechanism for the exchanging of these chip cutting tools, they are generally referred to as machining centers. These milling machines and machining centers are designed to produce a finished workpiece from the raw starting material as quickly and precisely as possible. Great effort has been expended in making machine movements as fast as possible, and in designing milling tools that efficiently remove large quantities of waste material by their cutting action. During the actual machining operations the computer controlled movements of the milling tools through the workpiece are optimized for removing waste material from the workpiece in the form of chips at the maximum rate. When an exchange of tools is required, the interruption of the machining operation for the tool exchange function is typically so short that little time is added to that of actual machining.

The spindles on the most common CNC milling machines have either a vertical or horizontal orientation that sets the manner in which the milling cutters address the workpiece. It is obvious that workpieces may require milling from more than one side, and such workpieces require extra operations which may include repositioning of the workpiece on the machine's workholding table so that the cutters can address the other sides of the workpiece. This repositioning of the workpiece causes a loss of time and accuracy in the operations. Some milling machines have more than one tool driving spindle, with secondary spindles being able to work on the same or other sides of the workpiece. Milling machines that have these secondary spindles are, however, of special and expensive construction, and as such are less common in the industry. The most complex and expensive milling machines respond to these problems by the inclusion of mechanisms which tilt the spindle or the workpiece about one more axes, thus allowing the cutters to address the workpiece form more than one side. These complex machines, often called universal or 5-axis milling machines, while versatile in achieving many angles of milling, lose rigidity in the tilting mechanisms, can accommodate relatively smaller workpieces, and must be constructed with great and costly care to achieve accuracy.

DESCRIPTION OF PRIOR ART

Various milling machines and milling machine attachments are known in the art for facilitating milling operations on multiple sides of a workpiece. U.S. Pat. No. 5,628,594 describes a horizontal spindle insert for insertion in a universal turret, Bridgeport style, milling machines. While it does add a horizontal spindle to the vertical mill, this invention is limited to the turret mill, a less rigid style of milling machine, and it does not provide independent movement of the vertical and horizontal spindles. U.S. Pat. No. 5,175,914 describes a machine tool having dual spindles in which the spindles have parallel axes of rotation such that workpieces can be rotated for machining by generally stationary cutters in a lathe type operation. U.S. Pat. No. 4,785,525 shows a machine tool for complex machining with a spindle axis that is tiltable and a provision for rotating the workpiece as well. U.S. Pat. No. 4,726,577 presents a tilting fixture system for use with milling machines which provides a mechanism operable by the milling machine that can tilt the workpiece about a specific axis so that a second side is presented to the spindle cutters. Certain machine tools are known to provide a vertical spindle head mounted over the top of a horizontal spindle head and moving vertically with it on a common column. Machines of this type do not provide independent movement of the two spindles. U.S. Pat. No. 4,709,465 illustrates a system for interchanging spindle heads on a milling machine. The spindle heads may have various sizes and angles of spindle orientation to allow the cutters to address different sides of a workpiece. U.S. Pat. No. 988,231 shows a multiple milling machine with both horizontal and vertical spindles. This machine, while it does have multiple spindles, does not allow independent movement of the spindles. The FA series of milling machines by FIL Fresatrici of Italy are representative of a style of machine construction which utilizes a spindle carrier with a horizontal spindle and a another spindle carrier with a vertical spindle mounted to the top of the first mentioned spindle carrier. This style of machine does provide both horizontal and vertical spindles but the spindle carriers and spindles are not independently movable. Planar mills are exemplary of machines using a bridge style construction known in the machine tool industry which may have a side milling head slidably fixed to the column and one or more rail heads slidably fixed to a vertically elevating adjustable rail. The style of this machine most similar to the present invention is commonly known as an openside planar mill. These machines have only one linear movement allowed for table and workpiece with the other two orthogonal movements in the elevating rail. This aspect of the arrangement is fundamentally different from this invention, and has the disadvantage that the elevating rail of these machines is not symmetrical with respect to the column of the machine. Furthermore, the vertical axis leadscrew raises the entire rail and is not placed symmetrically in the column. Therefore machining forces impart twisting moments to the column of these machines reducing the rigidity and precision during machining operations, and compromises the orthogonality of the machine due to rail droop as wear in the guiding rails takes place.

The most popular and ubiquitous milling machines, bedmills, and machining centers have a construction in which the vertical axis of spindle movement is constrained and guided by a column portion of the machine structure which is itself fixed to the machine base. On these machines the leadscrew driving means that effects the upward and downward movement of the machine tool spindle is disposed within and near the front of the column, and in the plane of the spindle axis when viewed from the front. In this way the forces on the spindle are symmetrically transferred to the machine structure. It will be noted that this symmetrical distribution of forces is different than that which takes place in the openside planar construction described above. However, this central placement of the leadscrew assembly causes the leadscrew shaft to preclude the addition of any symmetrically located spindle assemblies to the column of the machine.

It may be seen then, that the milling machines and machining centers known to the art do not provide a simple mounting of two mutually perpendicular and symmetrically driven spindle axes. Further, milling machines and machining centers heretofore fail to provide two separate, independently movable spindles that have perpendicular axes of rotation and are movably mounted on a common column. Accordingly several objects and advantages of this invention are:

a) to provide a milling machine which can machine a workpiece in two generally perpendicular planes without refixturing the workpiece b) to provide a milling machine with horizontal and vertical spindles c) to provide a rigid machine design capable of heavy cutting d) to provide a machine construction which is symmetrical about the column of the machine e) to provide a machine tool construction which causes operating stresses to be carried through the center of the column f) to provide a machine construction in which wear in the guiding rails does not directly deteriorate the orthogonality of the machine movements g) to provide a means of controllably and independently moving both horizontal and vertical tool axis spindles mounted to a single column h) to provide a machine structure with both horizontal and vertical axis spindles and which allows use of either spindle without interference from the other i) to provide a leadscrew driving means for the horizontal and vertical axis spindle carriers that does not interfere with the movement of either spindle carrier and that is symmetrically located in the machine column j) to provide a machine design that allows use of current bedmill bases with little modification Further objects and advantages will become apparent from a consideration of the ensuing description and drawings.

SUMMARY OF THE INVENTION

This invention improves on the prior art by providing a means for a bedmill style of milling machine or machining center to mill in both vertical and horizontal planes with independently controllable and movable rotating tool spindles without refixturing the workpiece. The bedmill type of milling machine is often preferred over the older style of milling machines known as turret mills or knee mills because of the greater rigidity of the machine which results in better accuracy of machining. The improved bedmill of this invention retains the standard vertical axis tool driving spindle and adds a horizontal axis tool driving spindle and spindle carrier for added milling capability. This horizontal axis spindle carrier is slidably fixed to guiding rails that may be the same as those to which are fixed the usual vertical axis spindle carrier. This horizontal axis spindle carrier is moved linearly up and down the guiding rails by a separate motor driven leadscrew and nut arrangement such that it may have vertical movement independent of the vertical axis spindle carrier. The horizontal axis spindle carrier is disposed such that when moved to the lower extreme of its vertical travel, the vertical axis spindle carrier may have essentially all of its normal vertical movement, and as such can address the workpiece for milling operations in the usual manner. Similarly, when the vertical axis spindle carrier is moved to the highest position on the machine column, the horizontal axis spindle carrier is free to move through a useful range of vertical movement for machining of the workpiece.

DESCRIPTION OF THE DRAWINGS

The invention is explained in detail by reference to a preferred embodiment illustrated in the accompanying drawings, wherein.

DETAILED DESCRIPTION OF THE INVENTION

Figure 1:
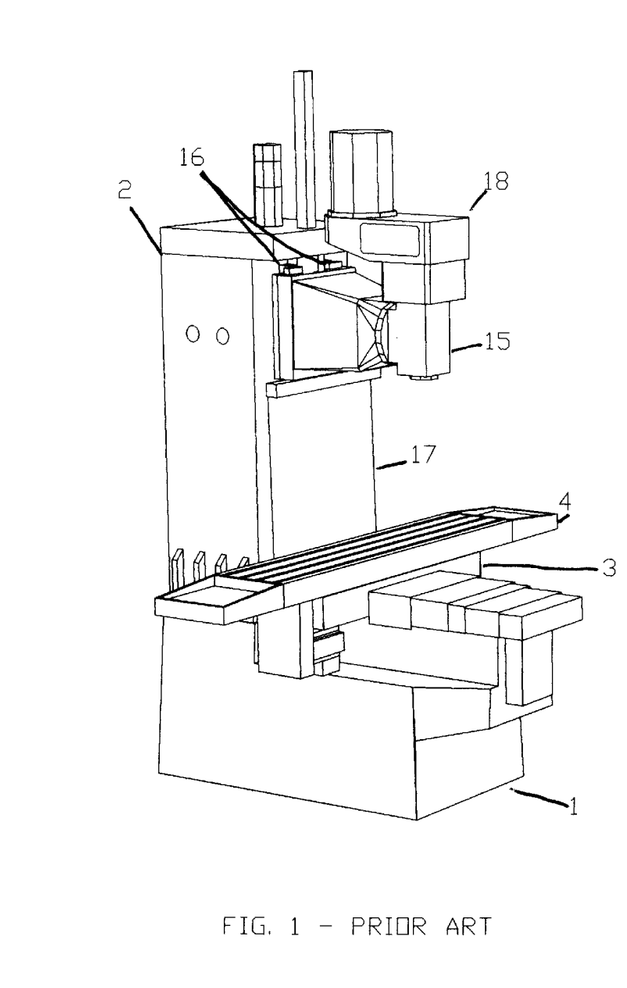
FIG. 1 is a perspective view of a standard milling machine structure of a type used in bedmills and machining centers.
Figure 1A:
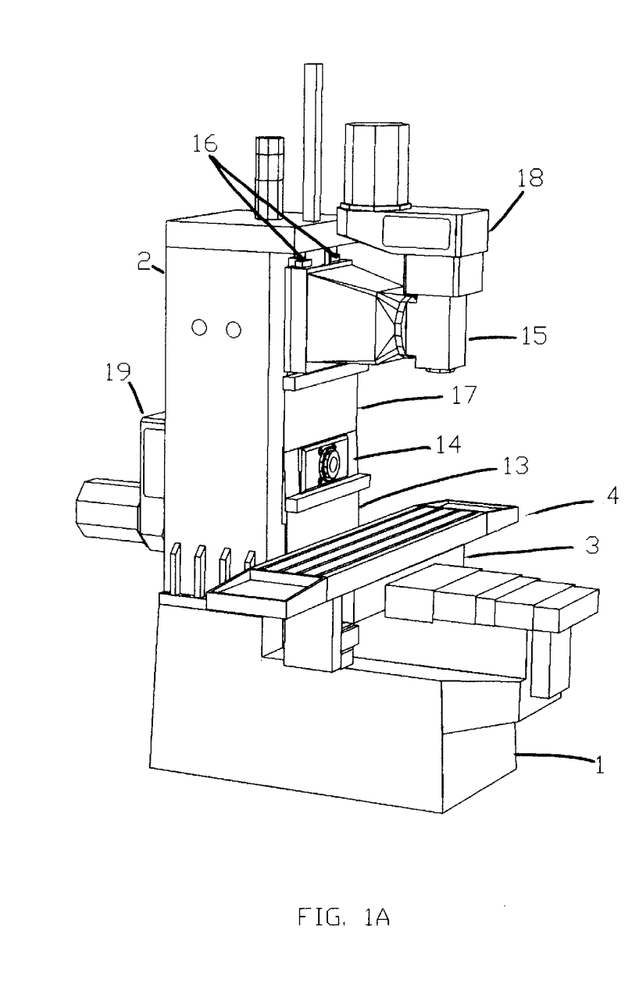
FIG. 1A is a perspective view of a similar milling machine structure to that of FIG. 1 with the horizontal axis spindle carrier improvement of this invention added.
Figure 2:
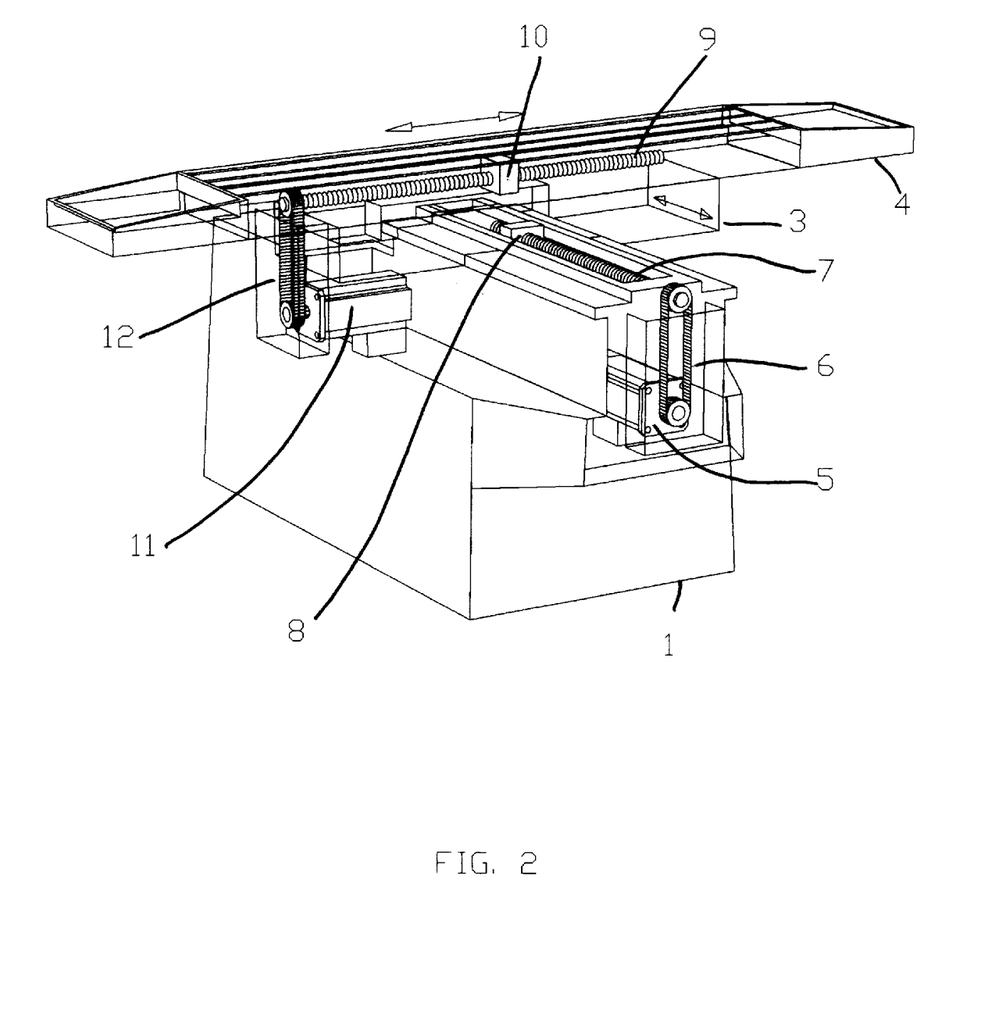
FIG. 2 is a perspective view of a partial bedmill with the machine base, saddle, and table in phantom lines to illustrate the associated driving means.
Figure 3:
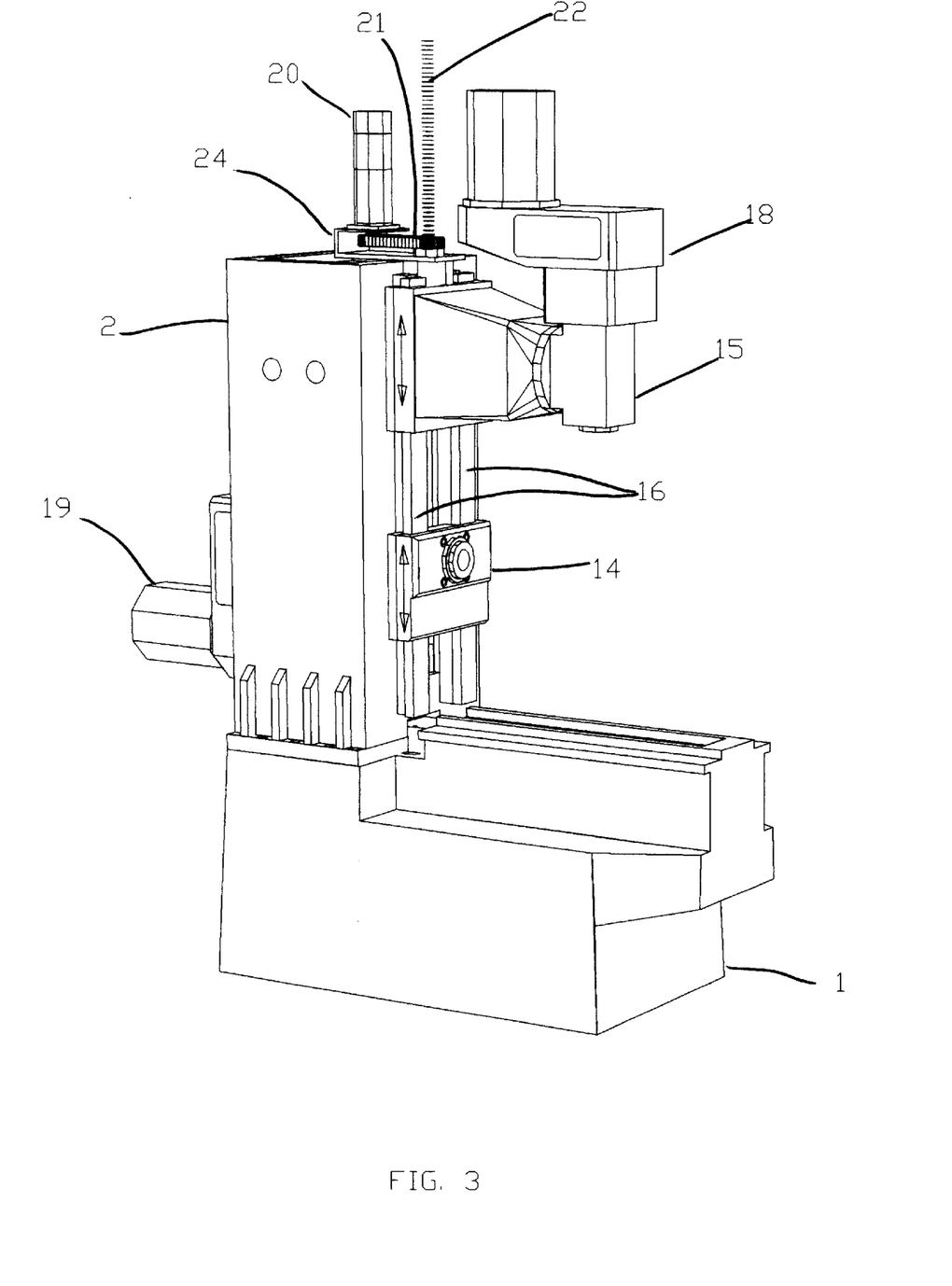
FIG. 3 is perspective view of the improved bedmill with the table, saddle, and waycovers removed for clarity.

One embodiment of the invention will now be described with reference to the accompanying drawings. Throughout the following descriptions, reference will be made to directions up, down, top, bottom, left, right, front, and back and should be interpreted as seen by an operator standing at the front of and facing the described machine tool. Referring first to FIGS. 1 and 2, a column 2 is fixed to base 1. Linear movements of saddle 3 and table 4 are shown by double arrows in FIG. 1. Referring to a phantom line view in FIG. 2, nut 8 fixed to saddle 3, which itself is slidably fixed to base 1, is linearly moved by motor 5 and belt 6 driving leadscrew 7. Nut 10 fixed to table 4, which itself is slidably fixed to saddle 3, is linearly moved by motor 11 and belt 12 driving leadscrew 9. Referring again to FIG. 1, guiding rails 16 are fixed with reference to column 2 and are protected from direct contact with chips generated in the machining process by way covers 13 and 17. The machine tool is shown in FIG. 3 with the table 4 and saddle 3 removed for clarity. In FIG. 3, horizontal spindle carrier 14 is slidably fixed to column 2, and vertical spindle carrier 15 is similarly slidably fixed to column 2 above said horizontal spindle carrier 14. Power unit 18 is shown attached to the top of vertical spindle carrier 15, and a possibly identical power unit 19 is attached to the back end of horizontal spindle carrier 14.

Figure 4:
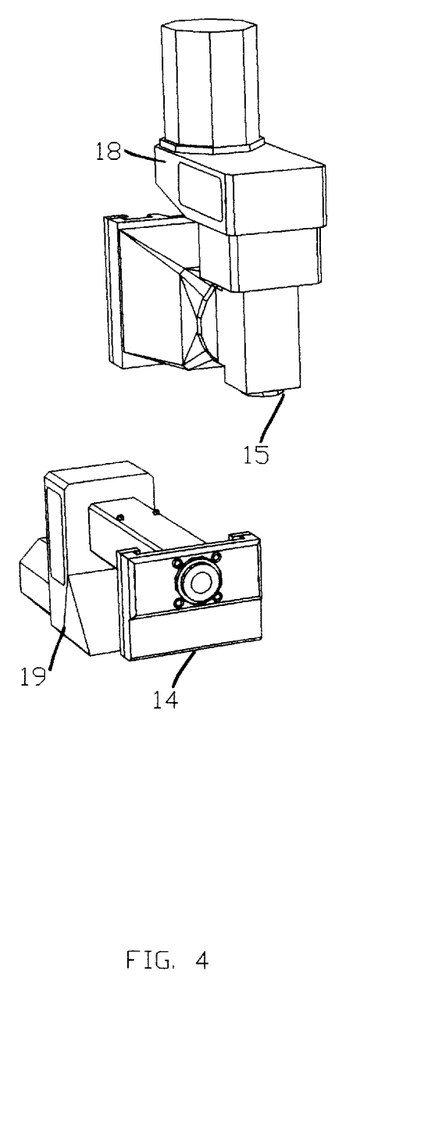
FIG. 4 is perspective view of the vertical axis spindle carrier and the horizontal axis spindle carrier shown removed from the machine.
Figure 5:
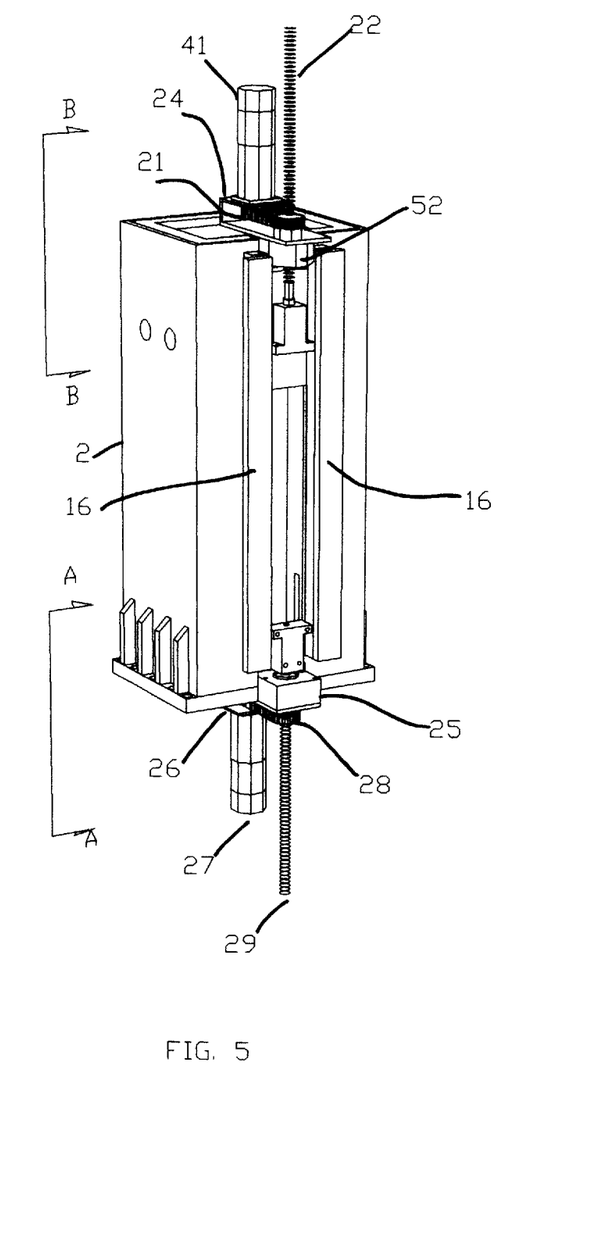
FIG. 5 is a perspective view of the improved bedmill column with both the vertical and horizontal axis spindle carriers removed.

Again with reference to FIG. 3, motor 20, mounted on bracket 24, is connected through drive belt 21 to rotate nut 23, not visible, in nut housing 30, causing leadscrew 22 which is anti-rotationally fixed to vertical spindle carrier 15 to move linearly upwardly and downwardly along guiding rails 16. FIG. 4 shows horizontal spindle carrier 14 with power unit 19 and vertical spindle carrier 15 with power unit 18. FIG. 5 shows column 2 with horizontal spindle carrier 14 and vertical spindle carrier 15 removed for clarity. At the bottom of column 2, a motor 27, mounted to bracket 26, is connected through drive belt 28 to rotate nut 30, not visible, in nut housing 25 causing leadscrew 29 which is anti-rotationally fixed to horizontal spindle carrier 14, not shown, to move linearly upwardly and downwardly along guiding rails 16. At the top of column 2, a motor 41, mounted to bracket 24, is connected through drive belt 21 to rotate nut 53, not visible, in nut housing 52 causing leadscrew 22 which would be anti-rotationally fixed to vertical spindle carrier 15, not shown, to move linearly upwardly and downwardly along guiding rails 16.

Figure 6:
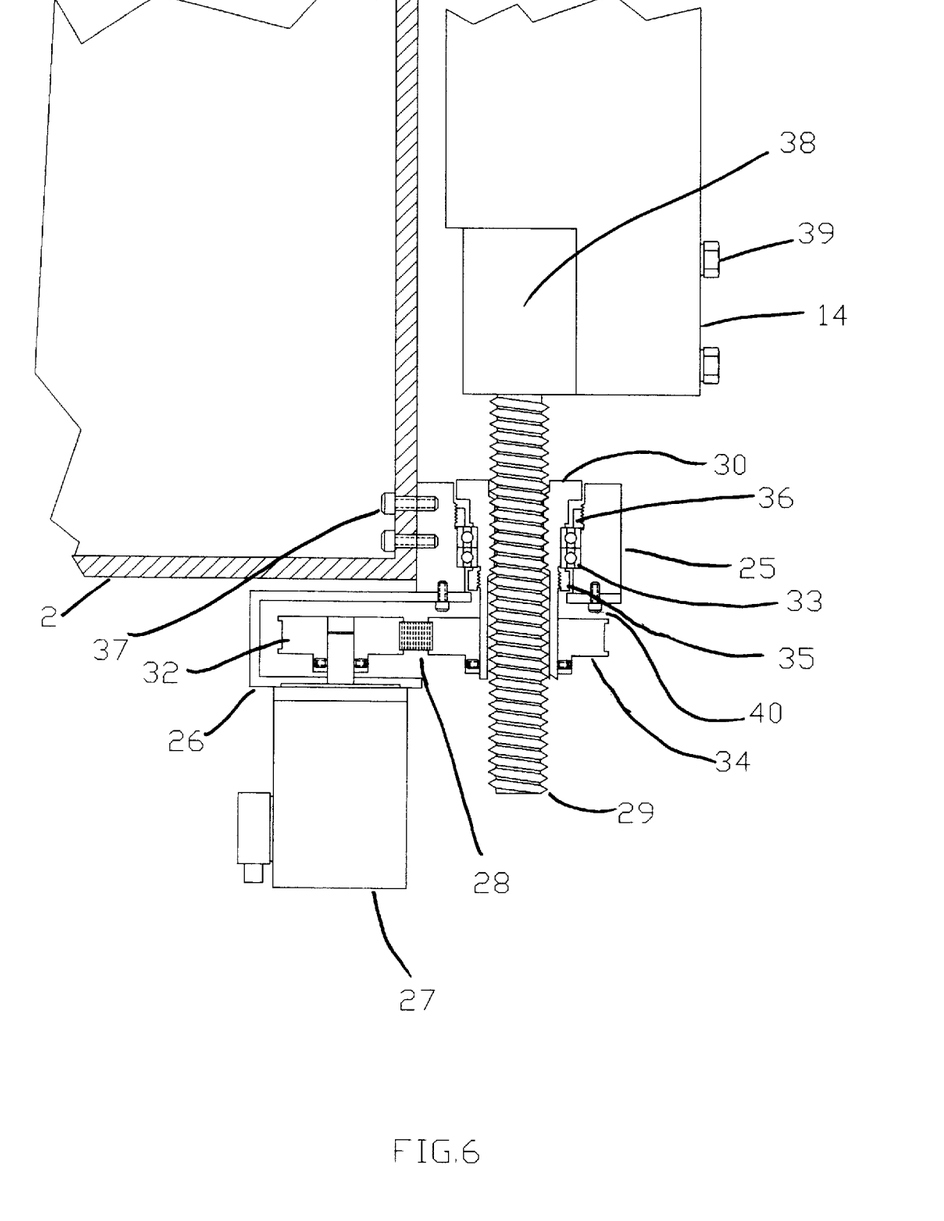
FIG. 6 is a side view, partially in section, of the lower portion of the machine column illustrating the horizontal axis spindle carrier driving means.

Referring to FIG. 6, the lower leadscrew assembly as shown in FIG. 5 is shown in section from the viewpoint A—A along with a portion of the lower area of column 2. Nut housing 25 is fixed to column 2 by screws 37. Nut 30 is rotatably fixed in nut housing 25 by one or more bearings 33 which are clamped within the nut housing 25 by inner race locknut 35 and outer race locknut 36. Motor 27 is secured to bracket 26 that is itself secured to nut housing 25 by a plurality of screws 40. Connecting the motor 27 and the nut 30 is belt 28 running across pulley 32 and pulley 34. The upper end of leadscrew 29 has an attachment portion 38 which is anti-rotationally fixed to horizontal spindle carrier 14 by one or more screws 39.

Figure 7:
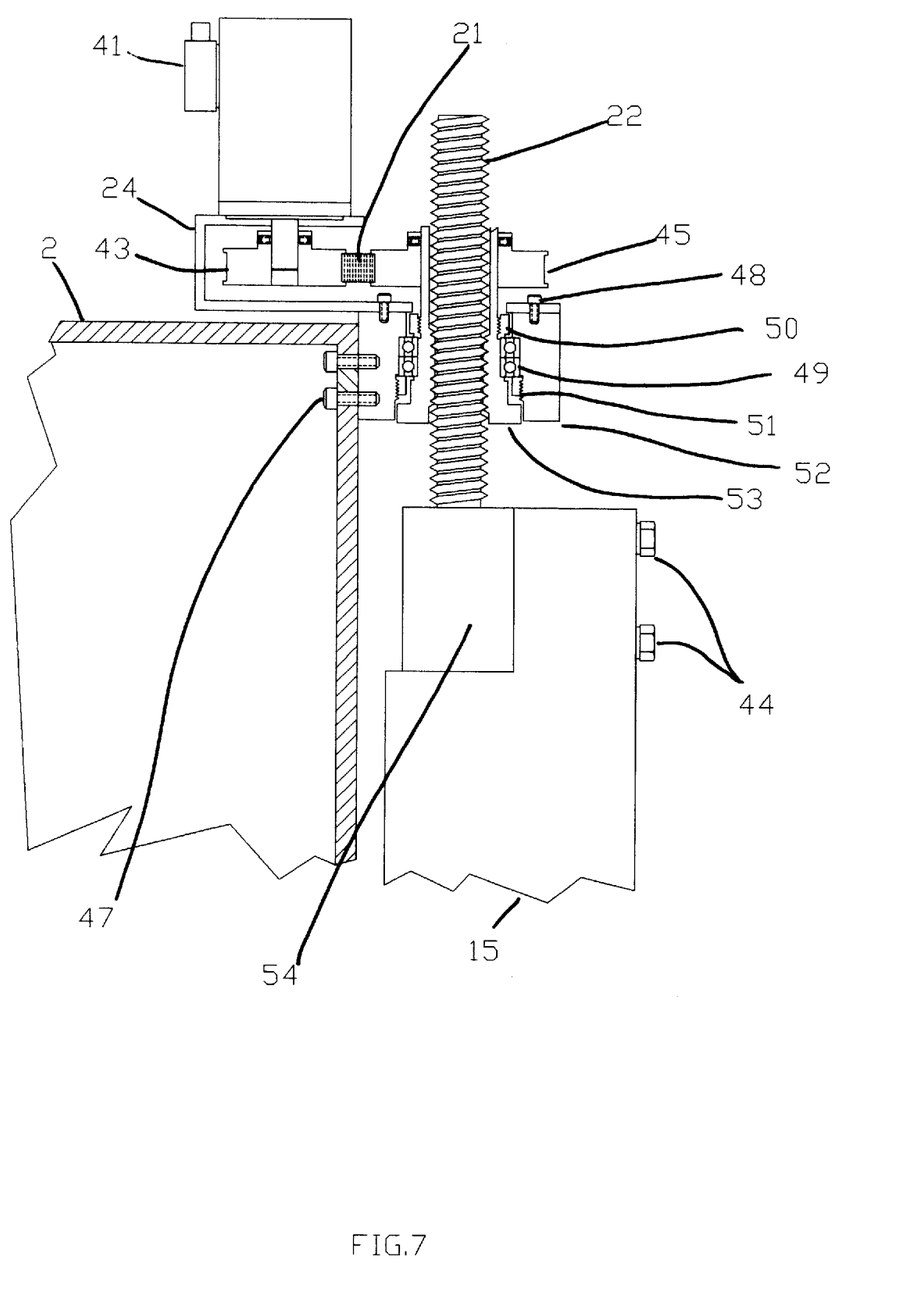
FIG. 7 is a side view, partially in section, of the upper portion of the machine column illustrating the vertical axis spindle carrier driving means.

Referring to FIG. 7, the upper leadscrew assembly as shown in FIG. 5 is shown in cross-section from the viewpoint B—B along with a portion of the upper area of column 2. Nut housing 52 is fixed to column 2 by screws 47. Nut 53 is rotatably fixed in nut housing 52 by one or more bearings 49 which are clamped within the nut housing 52 by inner race locknut 50 and outer race locknut 51. Motor 41 is secured to bracket 24 that is itself secured to nut housing 52 by a plurality of screws 48. Connecting the motor 41 and the nut 53 is drive belt 21 running across pulley 43 and pulley 45. The lower end of leadscrew 22 has an attachment portion 54 which is anti-rotationally fixed to vertical spindle carrier 15 by one or more screws 44.

Figure 8:
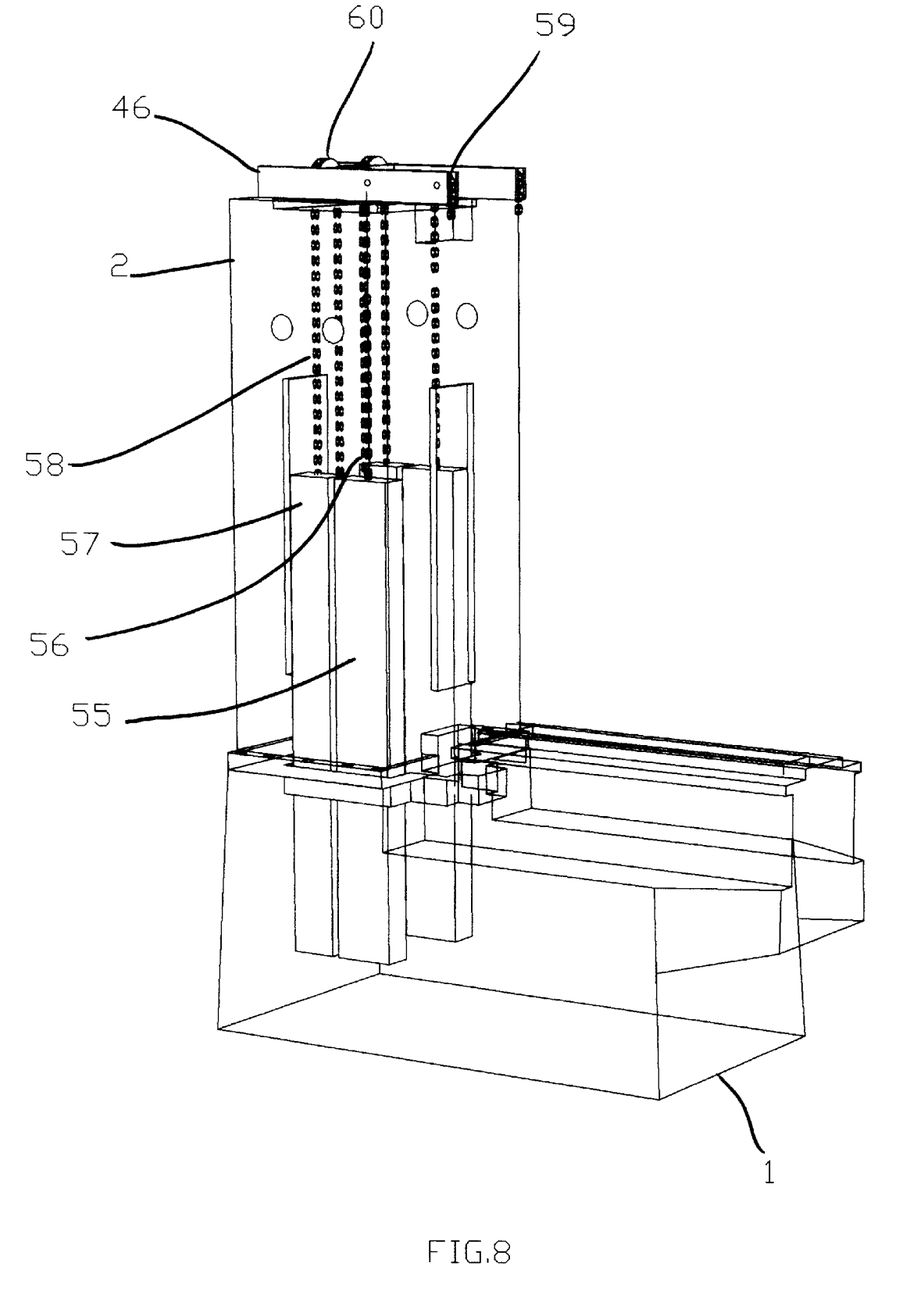
FIG. 8 is phantom line perspective view of the machine base and column illustrating the location of the counterweight arrangements.

A phantom view of the base 1 and column 2 is shown in FIG. 8 to illustrate the location of the vertical spindle carrier counterweights 55 connected to chains 56 and horizontal spindle carrier counterweights 57 connected to chains 58. Chains 56 runs across pulleys 59 and chains 58 run across pulleys 60 that are mounted in pulley bracket 46 at the top of the column 2.

Figure 9:
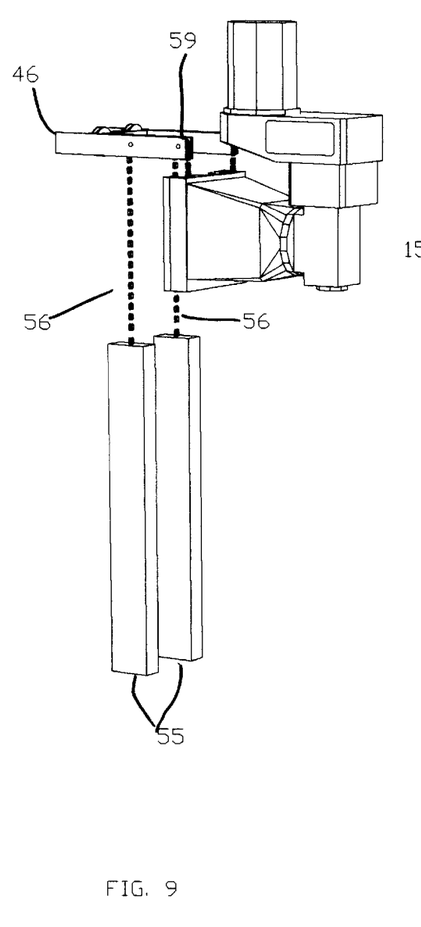
FIG. 9 is a perspective view of the vertical axis spindle carrier with the associated counterweight arrangement.

FIG. 9 depicts the counterbalance system for the vertical spindle carrier 15. The counterweights 55 are connected by chains 56 across pulleys 59 mounted in pulley bracket 46 to vertical spindle carrier 15 with power unit 18 shown attached.

Figure 10:
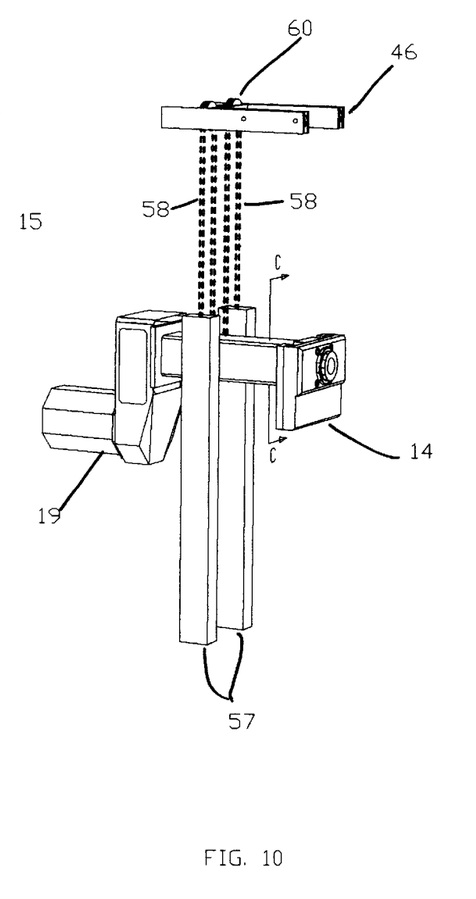
FIG. 10 is a perspective view of the horizontal axis spindle carrier with the associated counterweight arrangement.

FIG. 10 depicts the counterweight system for horizontal spindle carrier 14. The counterweights 57 are connected by chains 58 across pulleys 60 mounted in pulley bracket 46 to horizontal spindle carrier 14 with power unit 19 attached.

Figure 11:
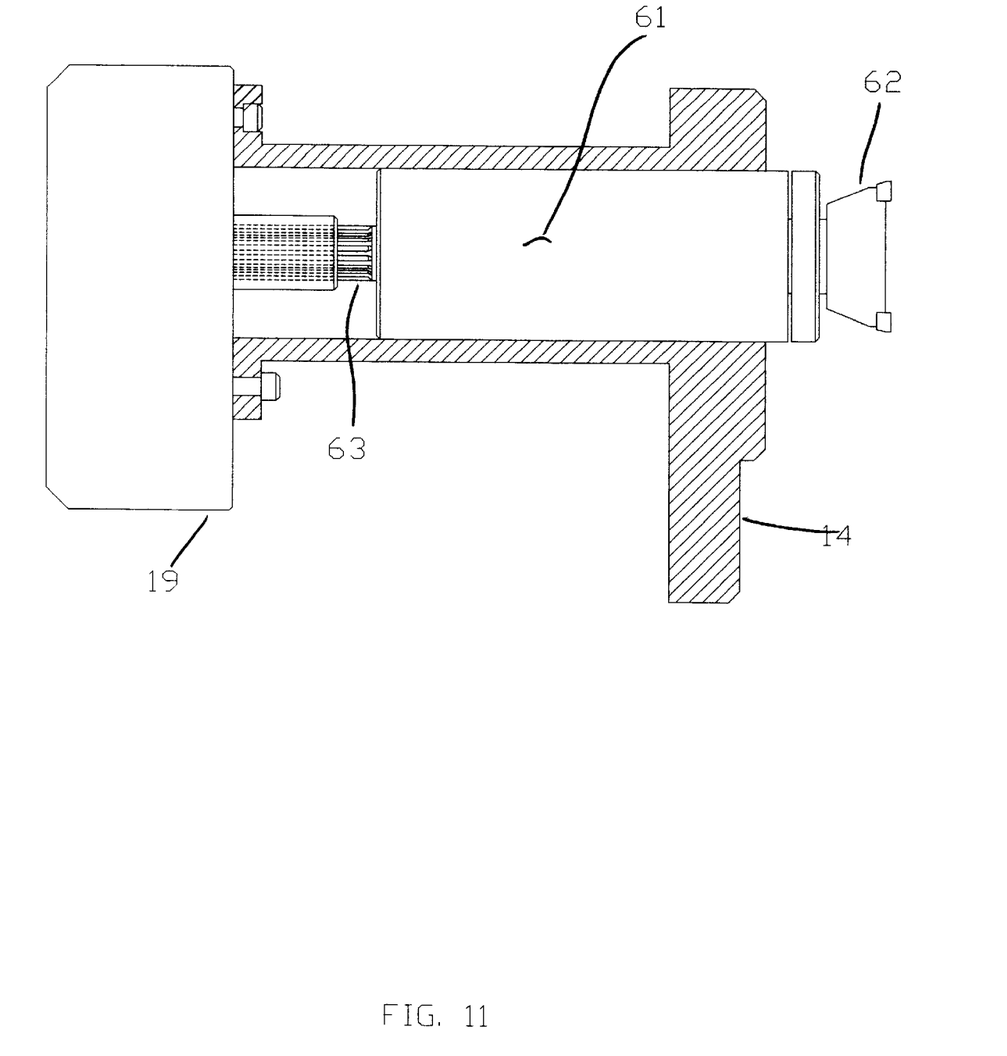
FIG. 11 is a sectional view of the horizontal axis spindle carrier with a cartridge type spindle shown with mounted milling cutter.

Referring to FIG. 11, the horizontal spindle carrier assembly 14 as shown in FIG. 10 is shown viewed from the side cut along section line C—C to show cartridge spindle assembly 61 with mounted milling tool 62. A splined portion of horizontal spindle shaft 63 is drivingly connected to power unit 19 and at the opposite end mounts a milling cutter 62. The mounting of said cutter 62 is well known to the art and a variety of cutters, drills, reamers, etc. could be mounted in standardized interfaces.

Figure 12:
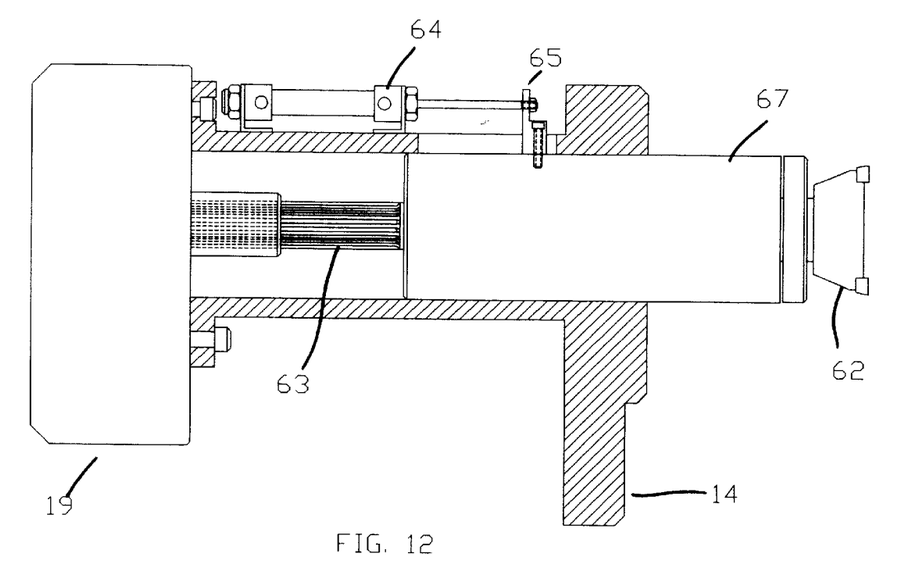
FIG. 12 is a sectional view of the horizontal axis spindle carrier with a quill type spindle assembly shown extended.

In FIG. 12, a quill 67 is slidably fixed and in a relatively extended position with respect to horizontal spindle carrier 14. A linear actuation device 64, in this case shown as a pneumatic cylinder, is connected through its piston rod 66 to bracket 65, in such manner as to be able to extend and retract quill 61 with reference to horizontal spindle carrier 14. The function of the linear extension device could be served by a variety of mechanisms including hydraulic cylinders, motor or hand driven lead screws, etc. A splined portion of horizontal spindle shaft 63 is drivingly connected to power unit 19 and at the opposite end mounts a milling cutter 62. The mounting of said cutter 62 is well known to the art and a variety of cutters, drills, reamers, etc. could be mounted in standardized interfaces.

Figure 12A:
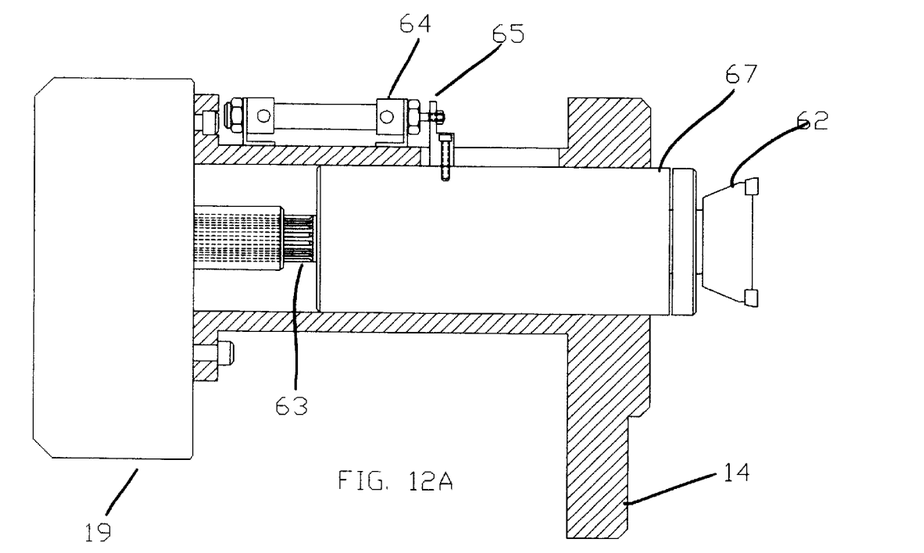
FIG. 12A is a sectional view of the horizontal axis spindle carrier with a quill type spindle assembly shown retracted.

In FIG. 12A, a similar view to FIG. 12 is shown, except that quill 61 is shown relatively retracted with respect to horizontal spindle carrier 14.

Figure 13:
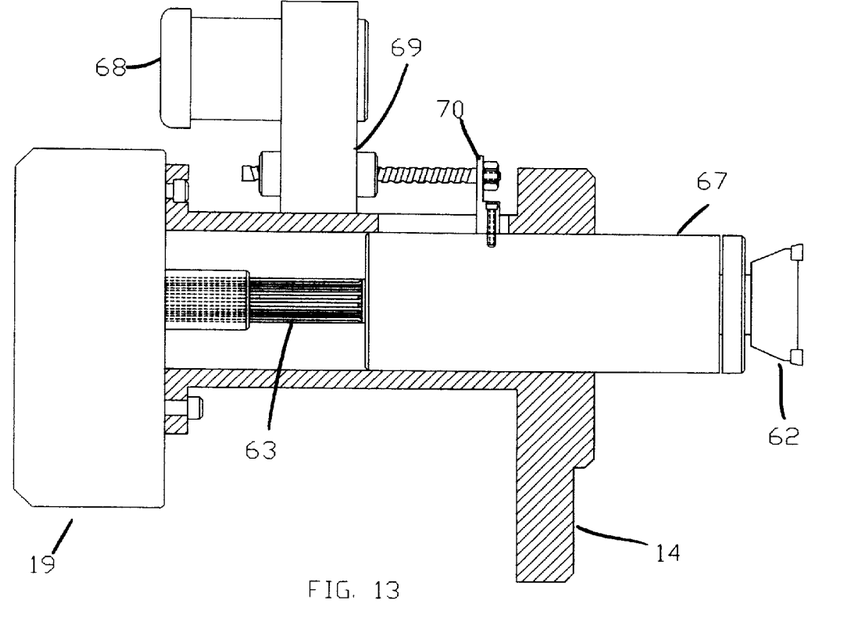
FIG. 13 is a sectional view of an alternative quill type spindle assembly shown extended.
Figure 13A:
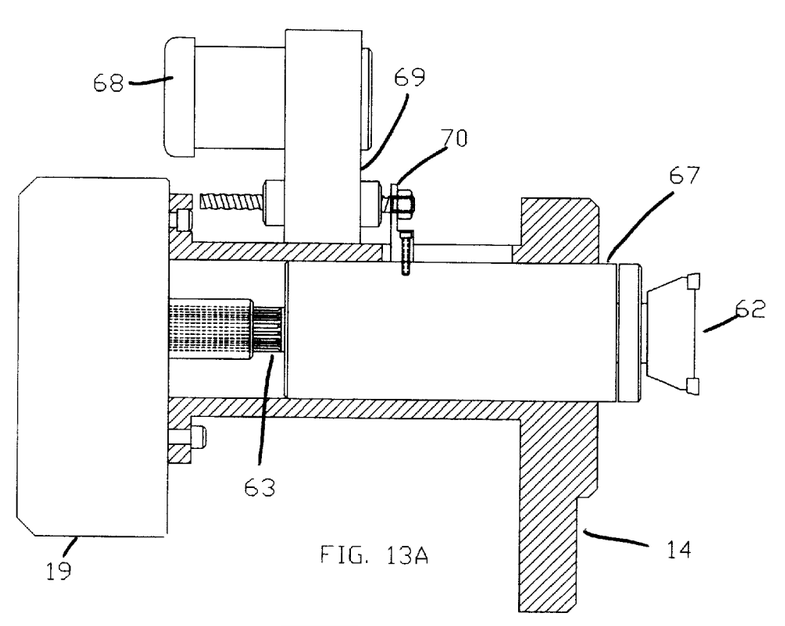
FIG. 13A is a sectional view of an alternative quill type spindle assembly shown retracted.

FIG. 13 and FIG. 13A are similar views to FIG. 12 and FIG. 12A, with an alternative linear extension device 69, in this case a leadscrew drive unit, powered by motor 68, with leadscrew shaft 71 fastened to bracket 70, which is itself fixed to quill 67.

Operation of the Invention

This invention improves on the prior art by providing a mean for a bedmill style of milling machine to mill in both vertical and horizontal planes without refixturing the workpiece. The functionality of one embodiment of this invention will be described as it would be applied to a basic style of milling machine such as a bedmill. Such directions as right, left, up, down, front, and back should be understood as being described as viewed by an operator standing in front of and facing the machine. Referring to FIG. 1 through 5, the saddle 3 and table 4 movements are shown by double arrows. The bedmill type of milling machine is often preferred over the older style of milling machines known as turret mills or knee mills because of the greater rigidity of the machine which results in better accuracy of machining. The improved bedmill of this invention retains the standard vertical axis tool driving spindle which is held in the usual spindle carrier assembly 15 that is slidably fixed to guiding rails 16 along the front of the machine column 2. The vertical spindle carrier assembly 15 is generally moved linearly up and down, marked with a double arrow, along the column guiding ways 16 by a leadscrew and nut arrangement 22 that is driven by a rotary electric motor 20. In this invention a horizontal axis tool driving spindle and spindle carrier 14 is added to the machine. This horizontal axis spindle carrier 14 is slidably fixed to guiding rails 16 that may be the same as those to which are fixed the vertical axis spindle carrier 15. This horizontal axis spindle carrier 14 is moved linearly up and down the guiding rails 16, marked by a double arrow, by a separate leadscrew and nut arrangement 29 which is driven by a motor 27 such that it may have vertical movement independent of the vertical axis spindle carrier 15. The horizontal axis spindle carrier 14 is disposed such that when moved to the lower extreme of its vertical travel, the vertical axis spindle carrier 15 may have essentially all of its normal vertical movement, and as such can address the workpiece for milling operations in the usual manner. Similarly, when the vertical axis spindle carrier 15 is moved to the highest position on the machine column 2, the horizontal axis spindle carrier 14 is free to move through a useful range of vertical movement for machining of the workpiece.

From the description above it can be understood that this invention gives independent and unrestricted use of both horizontal and vertical spindles to milling machines and machining centers of the common bedmill style of construction, thus making this inexpensive style of machine much more efficient and productive in milling operations.

Similar leadscrew assemblies may be used for the vertical movement of both the vertical axis spindle carrier 15 and the horizontal axis spindle carrier 15, one of which will be described. With reference to FIG. 6, 3, and 5, a leadscrew nut housing 25 is attached with screws 37 at the front of the lower portion of column 2. Rotatably fixed by bearings 33 in the nut housing 25 is leadscrew nut 30 to which is fixed a pulley 40 which is drivingly connected by belt 28 to motor 27. When rotated by motor 27 through belt 28 and pulleys 32 and 34, nut 30 imparts a linear vertical upward or downward motion to leadscrew 29 which is anti-rotationally fixed by means of attachment portion 38 and screws 39 to horizontal spindle carrier 14. In the case of computer controlled milling machines and machining centers the rotation of motor 27 would be responsive to programmed electric signals from the machine computerized controller. A similar arrangement, mounted at the front of the upper portion of column 2, is made for the leadscrew assembly that drives the vertical axis spindle carrier.

The preferred counterbalance system is shown in FIGS. 8, 9, and 10. Two generally identical counterweights 55 are connected by link chains 56, although other flexible tensile members could be used, across pulleys 59 to vertical axis spindle carrier 15 and are in combination approximately equal in weight to the vertical axis spindle carrier 15. A similar arrangement is used for counterweights 57 that are connected by chains 58 over pulleys 60 to horizontal spindle carrier 14. In both cased the dual counterweights are placed such that the counterbalanced weight is symmetrically compensated, and at the same time the use of dual counterweights allows unimpeded vertical movement of the horizontal axis spindle carrier 14.

With reference to FIG. 3, it may be seen that this arrangement of leadscrew assemblies causes the leadscrew shafts 22 and 29 to extend upward and downward away from the central portion of the column, thus allowing unobstructed movement of both the vertical and horizontal axis spindle carriers. Additionally this arrangement allows the leadscrews to be placed symmetrically with respect to the column and spindle carriers, thus assuring the most accurate movements during machining operations.

The horizontal axis spindle as shown in FIG. 3 is rotationally fixed as a cartridge spindle in the horizontal axis spindle carrier, however in a alternative embodiment, the horizontal axis spindle carrier may be provided with a quill assembly 61 having relative horizontal movement with respect to horizontal axis spindle carrier 14. Referring to FIGS. 11, 11A, 12, 12A, 13, and 13A, said quill assembly 61 can be seen in extended and retracted positions. In machining operations the extended position can allow the milling tool 62, or other common milling tools, access to workpiece geometry where greater horizontal penetration is necessary. The linear movement of the quill assembly 61 may be effected by a variety of means including pneumatic and hydraulic cylinders, leadscrews with rotary driving motors, etc.

What is claimed is:

1. A machine tool for chipmaking and grinding machining operations comprising:

a base;

a column fixed to said base;

guiding rails fixed in reference to the column for directing the generally linear upward and downward movement of spindle carriers with respect to the column;

a first spindle carrier slidably carried on said guiding rails wherein a tool driving spindle with a vertical axis of rotation is rotatably carried;

a second spindle carrier slidably carried on said guiding rails wherein a tool driving spindle with a horizontal axis of rotation is rotatably carried;

driving means for moving said spindle carriers upwardly and downwardly;

independent counterbalancing means for each spindle carrier;

driving means to impart rotation to the tool driving spindles;

whereby machining operations can be carried out in mutually perpendicular planes.

2. The machine tool of claim 1 wherein said second spindle carrier comprises a slidably mounted quill wherein said tool driving spindle with a horizontal axis of rotation is rotatably carried.

3. The machine tool of claim 1 wherein said driving means for moving the spindle carriers upwardly and downwardly comprises leadscrew mechanisms driven by rotary motors.

4. The machine tool of claim 3 wherein one or more of said leadscrew mechanisms comprise a translationally fixed nut rotatingly driven about a leadscrew shaft anti-rotationally fixed to the associated spindle carrier.

5. The machine tool of claim 3 wherein said leadscrew mechanisms are placed above or below the respective spindle carrier with which they are associated in such manner that the mechanisms are substantially parallel, and during operation extend and retract to the outside of the space between to the two spindle carriers.

6. The machine tool of claim 1 wherein each said independent counterbalancing means comprises two counterweights of approximately equal measures connected by tensile members traveling over fixed pulleys and traveling in substantially parallel paths which are to either side of the said second spindle carrier and which allow unimpeded vertical movement of said second spindle carrier.

7. The machine tool of claim 1 wherein said driving means to impart rotation to the tool driving spindles comprises substantially identical motor and speed shifting mechanisms.

8. The machine tool of claim 2 in which horizontal extension of said slidably mounted quill is linearly adjustable by controllable actuating means.

9. A machine tool for chipmaking and grinding machining operations comprising:

a base;

a column fixed to said base;

guiding rails fixed in reference to the column for directing the generally linear upward and downward movement of spindle carriers with respect to the column;

a first spindle carrier slidably carried on said guiding rails wherein a tool driving spindle with a vertical axis of rotation is rotatably carried;

a second spindle carrier slidably carried on said guiding rails wherein a tool driving spindle with a horizontal axis of rotation is rotatably carried;

leadscrews anti-rotationally fixed and linearly driven through rotating nuts for moving said spindle carriers upwardly and downwardly;

independent counterbalancing means for each spindle carrier;

driving means to impart rotation to the tool driving spindles;

whereby machining operations can be carried out in mutually perpendicular planes.

10. The machine tool of claim 9 wherein said second spindle carrier comprises a slidably mounted quill assembly wherein said tool driving spindle with a horizontal axis of rotation is rotatably carried.

11. The machine tool of claim 9 wherein said driving means for moving the spindle carriers upwardly and downwardly comprises leadscrew mechanisms driven by rotary motors.

12. The machine tool of claim 11 wherein one or more of said leadscrew mechanisms comprise a translationally fixed nut rotatingly driven about a leadscrew shaft anti-rotationally fixed to the associated spindle carrier.

13. The machine tool of claim 11 wherein said leadscrew mechanisms are placed above or below the respective spindle carrier with which they are associated in such manner that the mechanisms are substantially parallel, and during operation extend and retract to the outside of the space between to the two spindle carriers.

14. The machine tool of claim 9 wherein each said independent counterbalancing means comprises two counterweights of approximately equal measures connected by tensile members traveling over fixed pulleys and traveling in substantially parallel paths which are to either side of the said second spindle carrier and which allow unimpeded vertical movement of said second spindle carrier.

15. The machine tool of claim 9 wherein said driving means to impart rotation to the tool driving spindles comprises substantially identical motor and speed shifting mechanisms.

16. The machine tool of claim 10 in which horizontal extension of said slidably mounted quill is linearly adjustable by controllable actuating means.

17. The machine tool of claim 16 in which said controllable actuating means is one or more pneumatic or hydraulic cylinders.

18. The machine tool of claim 16 is which said controllable actuating means is one or more leadscrew drive units.

* * * * *